US011944086B2

(12) United States Patent
Butz (10) Patent No.: US 11,944,086 B2
(45) Date of Patent: *Apr. 2, 2024

(54) MOVING DECOY SUPPORT SYSTEM (71) Applicant: Scott A. Butz, Fargo, ND (US)

(72) Inventor: Scott A. Butz, Fargo, ND (US)

(*) Notice: Subject to any disclaimer, the term of this patent is extended or adjusted under 35 U.S.C. 154(b) by 0 days.

This patent is subject to a terminal disclaimer.

(21) Appl. No.: 18/171,721

(22) Filed: Feb. 21, 2023

(65) Prior Publication Data

US 2023/0200376 A1 Jun. 29, 2023

Related U.S. Application Data (63) Continuation of application No. 16/420,268, filed on May 23, 2019, now Pat. No. 11,589,572.

(51) Int. Cl.
A01M 31/06 (2006.01)
F16M 11/08 (2006.01)

(52) U.S. Cl.
CPC ............ A01M 31/06 (2013.01); F16M 11/08 (2013.01)

(58) Field of Classification Search
CPC ...... A01M 31/06; A01M 29/06; A01M 99/00; F16M 11/08; F16M 13/00; F16M 11/06; A45F 3/44; A45F 2200/05; E02D 5/801; E02D 5/80; A63H 33/40; G09F 7/22; E04H 15/62
USPC .......................... 43/2, 3; 248/156, 176.1, 530
See application file for complete search history.

(56) References Cited

U.S. PATENT DOCUMENTS

| | | | |
|---|---|---|---|
| 743,301 A | 11/1903 | Lischtiak | |
| 1,629,442 A | 5/1927 | Geisinger | |
| 2,028,849 A | 1/1936 | Shay | |
| 2,129,781 A | 9/1938 | Park | |
| 2,256,778 A | 9/1941 | Lundgren | |
| 2,341,028 A | 2/1944 | Fay | |
| 2,441,753 A | 5/1948 | Carpenter | |
| 2,442,417 A | 6/1948 | Lang | |
| 2,662,327 A * | 12/1953 | Petersen | ............... A01M 31/06 43/3 |
| 2,762,590 A | 9/1956 | Huie | |
| 2,810,223 A | 10/1957 | Fraesdorf, Jr. | |
| 3,079,115 A | 2/1963 | Edwards, Jr. | |
| 3,110,460 A | 11/1963 | Koonce | |
| 3,358,399 A | 12/1967 | Waldmann | |

(Continued)

OTHER PUBLICATIONS

Moving Decoy Support for a Decoy created by inventor, Scott A. Butz; Sep. 1, 2017.

Primary Examiner — Jeffrey R Larsen
(74) Attorney, Agent, or Firm — Neustel Law Offices (57) ABSTRACT A moving decoy support system for easy placement of decoys on stakes, and natural motion. The moving decoy support system generally includes a motion cone for the decoy, in which the motion cone has a first end, a second end, and a cavity extending into the first end toward the second end. The cavity has an opening at the first end and an upper surface at the second end which supports the decoy on a stake. The motion cone is mountable in the bottom of the decoy body. The motion cone may also have an upper, cylindrical portion and a funnel-shaped portion at the opening, so that the opening is larger than the inside, top of the cone. This allows for easier placement of the decoy on the stake. The motion cone allows the decoy to rotate and rock on the stake, giving the appearance of natural motion.

38 Claims, 11 Drawing Sheets

(56) References Cited

U.S. PATENT DOCUMENTS

| | | | |
|---|---|---|---|
| 4,012,017 A | 3/1977 | Springston | |
| 4,131,079 A | 12/1978 | Rousseau, Jr. | |
| 4,228,977 A | 10/1980 | Tanaka | |
| 4,651,457 A | 3/1987 | Nelson | |
| 4,669,684 A | 6/1987 | Vernelson | |
| D291,459 S | 8/1987 | Ruggles | |
| 4,779,825 A | 10/1988 | Sams | |
| 4,790,498 A | 12/1988 | Jeffrey | |
| 4,848,704 A | 7/1989 | Sams | |
| 4,850,798 A | 7/1989 | Bailey | |
| 4,893,428 A * | 1/1990 | Gagnon, Sr. | A01M 31/06 D22/125 |
| 4,911,384 A | 3/1990 | Stankus | |
| 5,003,722 A | 4/1991 | Berkley | |
| D323,003 S | 1/1992 | Plischke | |
| 5,524,851 A | 6/1996 | Huang | |
| 5,598,988 A | 2/1997 | Bukur | |
| 6,044,581 A | 4/2000 | Shipman | |
| 6,095,458 A | 8/2000 | Cripe | |
| 6,283,413 B1 | 9/2001 | Bukur | |
| 6,349,902 B1 | 2/2002 | Cripe | |
| 6,357,160 B1 | 3/2002 | Hackman | |
| 6,449,894 B1 | 9/2002 | Price, Sr. | |
| 6,782,653 B1 | 8/2004 | Thomas | |
| 6,907,688 B2 | 6/2005 | Brint | |
| 7,137,221 B2 | 11/2006 | Highby | |
| 7,285,500 B2 | 10/2007 | Todd et al. | |
| 7,458,181 B2 | 12/2008 | Butz | |
| 7,621,484 B2 | 11/2009 | Wingert | |
| 7,669,801 B2 | 3/2010 | Guadagna | |
| 7,874,093 B2 | 1/2011 | Rohrke | |
| 8,082,690 B2 * | 12/2011 | Zink, Jr. | A01M 31/06 43/3 |
| 8,739,456 B1 | 6/2014 | Butz | |
| 2001/0004812 A1 | 6/2001 | Lindaman | |
| 2004/0084577 A1 | 5/2004 | McMahan | |
| 2007/0199228 A1 | 8/2007 | Johnson | |
| 2008/0029659 A1 * | 2/2008 | Weber | A01M 31/06 248/156 |
| 2008/0163538 A1 | 7/2008 | Butz | |
| 2012/0066953 A1 | 3/2012 | Zink, Jr. | |

* cited by examiner

MOVING DECOY SUPPORT SYSTEM

CROSS REFERENCE TO RELATED APPLICATIONS

The present application is a continuation of U.S. application Ser. No. 16/420,268 filed on May 23, 2019 which issues on Feb. 28, 2023 as U.S. Pat. No. 11,589,572. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a moving decoy support system that is easier to set up and use, and creates life-like decoy motion.

Related Art

Any discussion of the related art throughout the specification should in no way be considered as an admission that such related art is widely known or forms part of common general knowledge in the field.

Waterfowl and other large-bird decoys have been in use for many years to help hunters attract birds such as turkeys, geese and ducks to a favorable hunting location. Decoys are available in a number of types, with varying degrees of realism and motion. Further, some decoys are made to float on water, while others are made for placement on land. Regarding those designed for use on land, for example, some may have openings that allow for mounting on stakes that allow the wind to move the decoys.

Past designs for decoys may have mechanisms that only allow for limited motion, such as rotation without any wobble, which simulates feeding behavior. Other designs allow for rotation over 360°, which in some circumstances results in unrealistic action. In addition, some decoys have enough friction between the stakes and the decoy body so that there is little or no motion in very light wind. Further, the openings of the decoys, into which the stakes are inserted, may be small and thus cause difficulty when a hunter attempts to place the decoy on the stake in the dark.

SUMMARY

An example embodiment is directed to a moving decoy support system. The moving decoy support system includes a motion cone for the decoy, and the motion cone has a first end, a second end, and a cavity extending into the first end toward the second end, the cavity comprising an opening proximate the first end and an upper surface proximate the second end. The motion cone is mountable in the bottom of the decoy body, such as in an opening in the bottom. The motion cone may also have a cylindrical portion proximate the second end and a funnel-shaped portion proximate the first end, wherein a cross sectional area of the cavity decreases along the funnel-shaped portion in relation to a distance from the opening toward the cylindrical portion. The upper surface of the motion cone may be shaped and positioned within the decoy to movably support the decoy on a stake end, and the decoy is rotatable relative to the stake end.

The motion cone may further comprise tabs for mounting the motion cone on a bottom of the decoy, and may further be used to mount the cone so that the opening of the cone is flush or substantially flush with the bottom of the decoy. In another example embodiment, the upper surface of the motion cone may comprise a concave portion, or may be entirely concave. Some embodiments of the motion cone may further comprise a flange or a plurality of flanges extending into the cavity that engage the stake end (e.g., ribs on the stake end) to limit rotation of the decoy.

Some embodiments of the moving decoy system further comprise a plurality of flanges in the motion cone that extend into the cavity that engage with one or more ribs on the stake end to limit rotation of the decoy.

In another example embodiment of the moving decoy system, the stake end comprises a ring-shaped upper surface that contacts the upper surface of the motion cone, which reduces the friction between the stake end and the upper surface of the motion cone, allowing for motion even in very slight breezes.

There has thus been outlined, rather broadly, some of the embodiments of the moving decoy support system in order that the detailed description thereof may be better understood, and in order that the present contribution to the art may be better appreciated. There are additional embodiments of the moving decoy support system that will be described hereinafter and that will form the subject matter of the claims appended hereto. In this respect, before explaining at least one embodiment of the moving decoy support system in detail, it is to be understood that the moving decoy support system is not limited in its application to the details of construction or to the arrangements of the components set forth in the following description or illustrated in the drawings. The moving decoy support system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

An example moving decoy support system generally comprises a moving decoy 10, such as a full-body decoy having a decoy body 12. The moving decoy support system includes a motion cone 30 for the decoy, and the motion cone 30 has a first end 31, a second end 33, and a cavity 35 extending into the first end 31 toward the second end 33, the cavity 35 comprising an opening 39 near or at the first end 31 and an upper surface 38 at or near the second end 33. The motion cone 30 is mountable in the bottom 14 of the decoy body 12, such as in an opening in the bottom 14. The motion cone 30 may also have a cylindrical portion 32 proximate the second end and a funnel-shaped portion 34 proximate the first end, wherein a cross sectional area of the cavity 35 decreases along the funnel-shaped portion in relation to a distance from the opening 39 toward the cylindrical portion 32. The upper surface 38 of the motion cone 30 may be shaped and positioned within the decoy 10 to movably support the decoy on a stake end 22, and the decoy 10 is rotatable relative to the stake end 22.

The motion cone 30 may further comprise tabs 36 for mounting the motion cone 30 on a bottom 14 of the decoy 10, and may further be used to mount the cone 30 so that the opening 39 of the cone 30 is flush or substantially flush with the bottom 14 of the decoy 10. In another example embodiment, the upper surface 38 of the motion cone 30 may comprise a concave portion, or may be entirely concave. Some embodiments of the motion cone 30 may further comprise a flange 37 or a plurality of flanges 37 extending into the cavity 35 that engage the stake end 22 (e.g., ribs 26 on the stake end 22) to limit rotation of the decoy 10.

In another example embodiment of the moving decoy system, the stake end 22 comprises a ring-shaped upper surface 24 that contacts the upper surface 38 of the motion cone 30. Due to the concave upper surface 38 and the ring-shaped surface 24, there is reduced friction between the stake end 22 and the upper surface 38 of the motion cone 30, allowing for motion even in very slight breezes.

In the decoy system, stakes 20 are placed in the ground wherever a decoy is desired. The stakes 20 include stake ends 22, which may be molded on, or formed, as part of each stake 20, or the stake ends 22 may be made to be inserted on the stakes, which, without stake ends 22, may be in the form of rods, such as fiberglass rods. The stake ends 22 may have a number or ribs 26, or even a single rib 26, extending radially from the stake end near the top end. In an example embodiment, a stake end 22 may have three ribs 26 spaced 120° apart around the top of the stake end 22.

As mentioned above, the decoy 10 may have a motion cone 30 mounted in its bottom, and in some embodiments the cone 30 may be substantially flush with the bottom 14 of the decoy. The motion cones 30 can include a funnel-shaped portion 34 at the open end 39, so that the opening is larger than the cylindrical portion 32 of the cone 30. The funnel shape and larger opening size makes it easier to set each decoy 10 on a stake 20, and the flush mount helps too, so that decoys 10 may be more easily placed on the stakes at night, for example. However, the cylindrical upper portion of the cone's interior helps control the motion of the decoy on the supporting stake 20. Specifically, the ribs 26 on the stake ends may fit fairly tightly within the cylindrical portion of the motion cone 30, which still allows for realistic motion of the decoy but prevents problems that could result from a fit between the stake end 22 and the motion cone 30 that is too loose.

B. Motion Cone

As best shown in FIGS. 3-7 and 13A-14B, the motion cone 30 may be used to allow easy installation of decoys 10 on stakes 20 positioned in a hunting area. The motion cone 30 has a first end 31, a second end 33, and a cavity 35 extending into the first end 31 toward the second end 33. The cavity 35 has an opening 39 at the first end 31. The cavity 35 terminates at an upper surface 38 at or near the second end 33. The motion cone 30 is funnel shaped at the first end, so that the opening 39 is larger than the rest of the cone. The larger opening makes it easier to drop a decoy 10 onto a stake in the dark, or without looking, since it provides a larger "target" for the stake end 22.

As also shown, the motion cone 30 may include tabs 36 for attaching the cone to an opening in the bottom 14 of a decoy body 12 using screws 40. The motion cone 30 may be sized to fit closely in an opening in the bottom 14 of the decoy 10, so that it may be secured in the decoy body 12 with the cone opening 39 being substantially flush with the bottom 14 of the decoy 10.

The motion cone 30 is mountable in the bottom 14 of the decoy body 12, such as in an opening in the bottom 14. The motion cone 30 may have a cylindrical portion 32 at the top, inside the decoy, and may also have a funnel-shaped portion 34 at the first end 31 of the cone 30. The cross sectional area of the cavity 35 decreases along the funnel-shaped portion in relation to the distance from the opening 39 toward the cylindrical portion 32 of the cone 30. In other words, due to the funnel shape of the bottom of the cone, the cone has a larger opening 39, which tapers to the cylindrical portion 32 at the opposite end of the cone. The motion cone 30 may be shaped so that the inner surface is substantially smooth and continuous from the opening 39 of the cone 30 at the first end 31, to the upper support surface 38 at the second end 33. This shape allows for the decoy 10 to be guided onto the stake end 22 as the decoy is dropped onto the stake 20, even though in its final position, the stake end 22, including ribs 26, fits closely within the cavity 35 of the cone.

Figure 8:
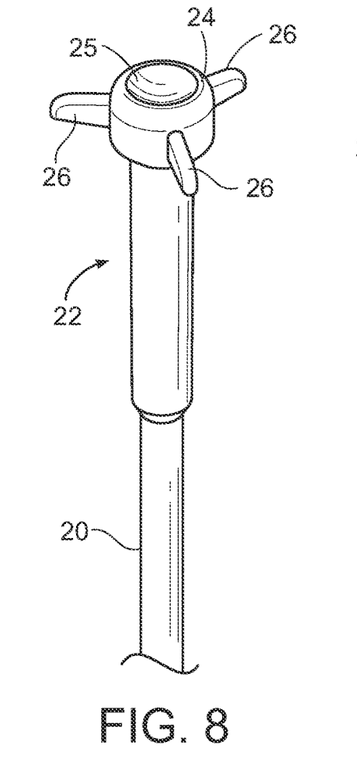
FIG. 8 is an upper perspective view of a stake usable in accordance with an example embodiment.
Figure 9:
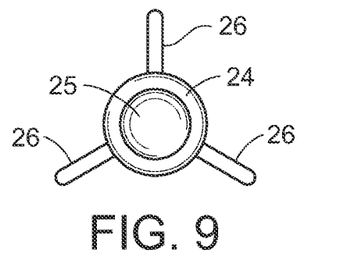
FIG. 9 is a top view of a stake usable in accordance with an example embodiment.
Figures 10, 12:
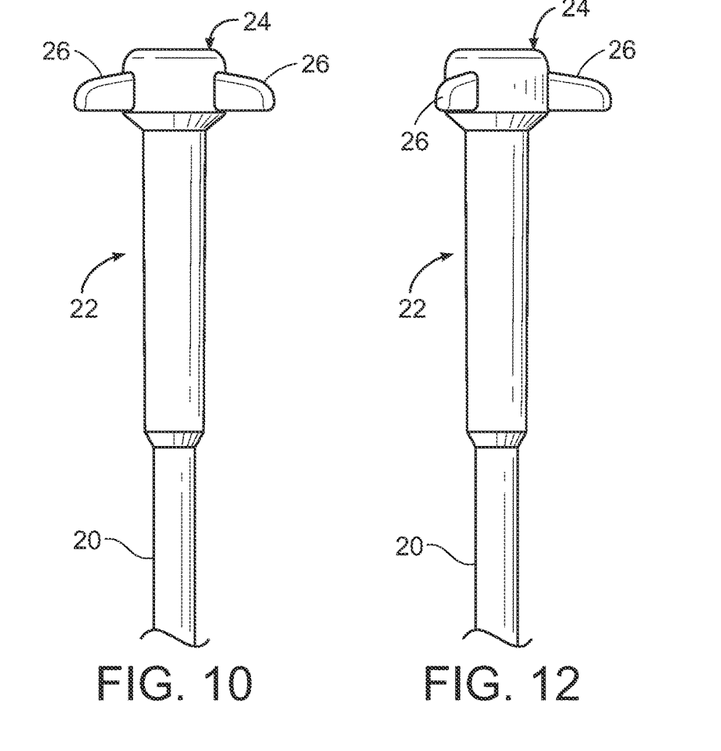
FIG. 10 is a side view of a stake usable in accordance with an example embodiment.
FIG. 12 is another side view of a stake usable in accordance with an example embodiment.
Figure 11:
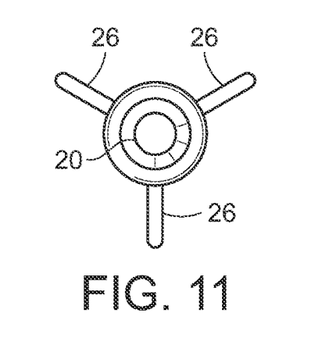
FIG. 11 is a bottom view of a stake usable in accordance with an example embodiment.

The upper surface 38 of the motion cone 30 is positioned so that the decoy is well balanced on the supporting stake 20. The upper surface 38 supports the decoy above its center of gravity, so that the decoy may readily rock or wobble on the stake end 22, as well as rotate. As shown in FIGS. 8, 10, and 12, the ribs 26 can have rounded tips that allow this motion, while the outermost point of the ribs may fit closely within the cylindrical portion 32 of the inside of the cone 30. The rounded tips of the ribs 26 also help facilitate insertion of the decoy onto the stake end 22, by allowing the decoy to self-center on the stake 20.

As mentioned briefly above, all or part of the upper surface 38 may be concave. This shape results in reduced friction between the upper surface 38 and the stake end's upper surface 24. This reduced friction in turn allows the decoy to move very easily, both rotationally and by tilting, in the presence of even a slight breeze. The concave shape may also help keep the decoy 10 balanced and centered on stake end 22.

Figure 5:
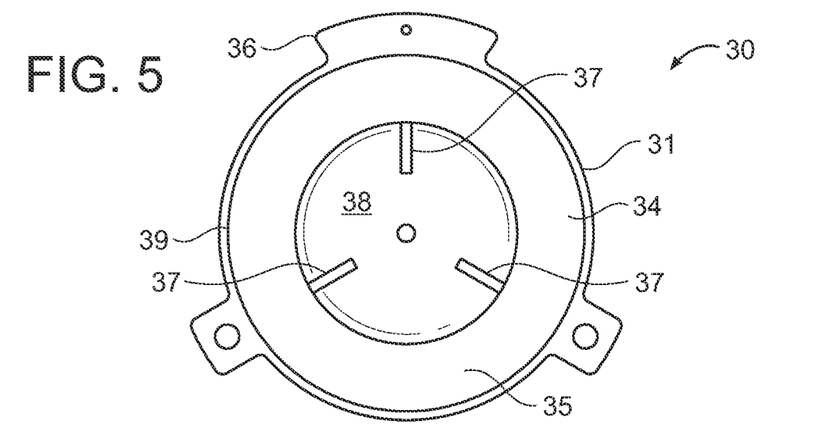
FIG. 5 is a bottom view of a motion cone usable in accordance with an example embodiment.
Figure 6:
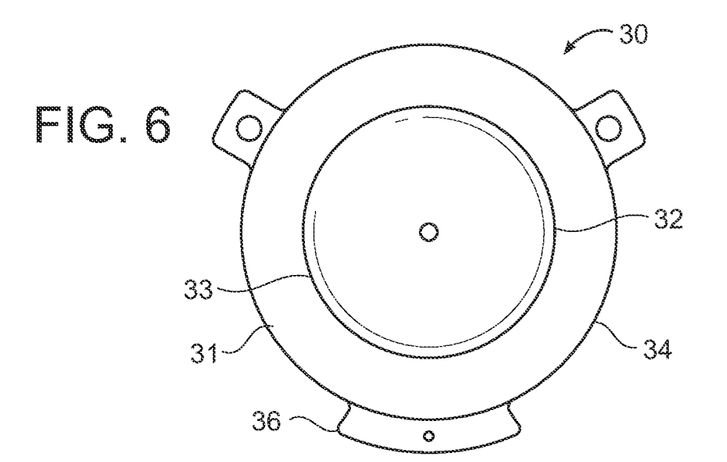
FIG. 6 is a top view of a motion cone usable in accordance with an example embodiment.
Figure 7:
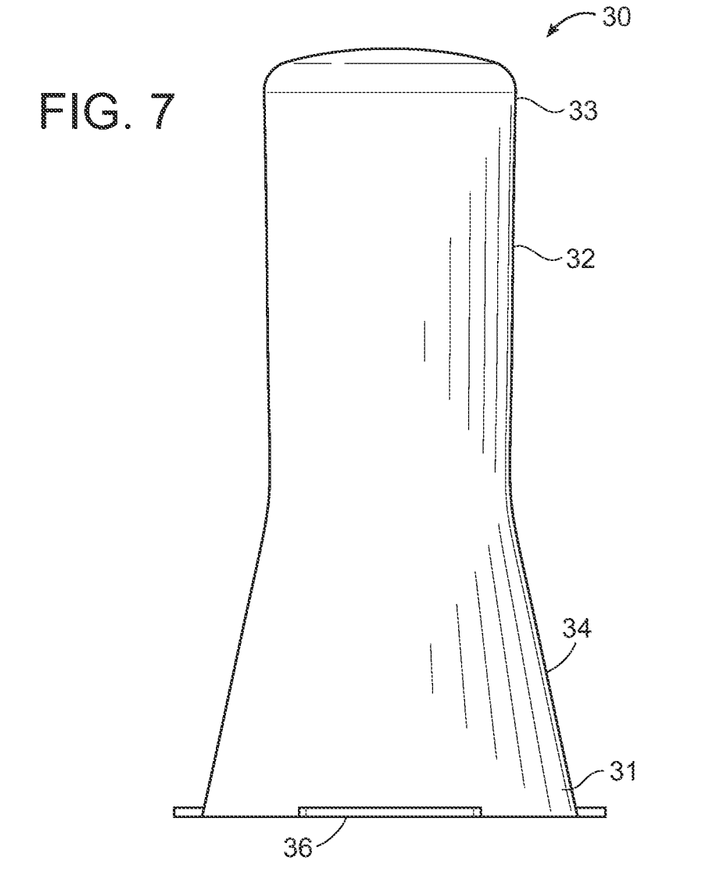
FIG. 7 is a side view of a motion cone usable in accordance with an example embodiment.
Figure 15:
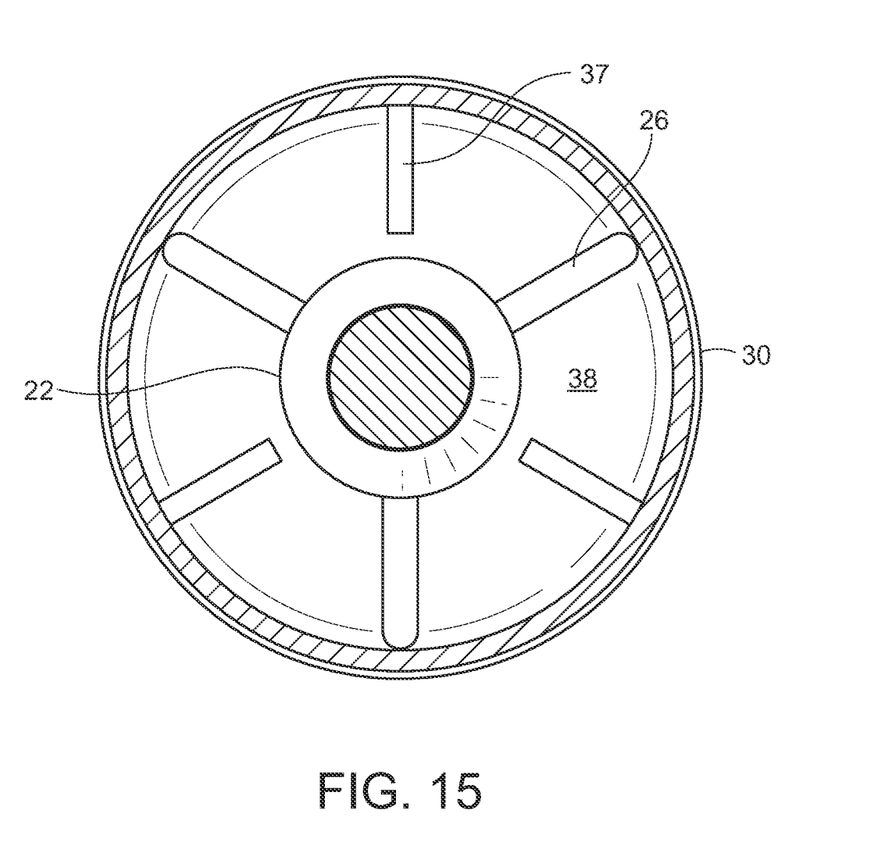
FIG. 15 is a sectional view of a motion cone and stake end taken at line 15-15 as shown in FIG. 14B, in accordance with an example embodiment.

As best shown in FIGS. 5 and 15, the motion cone 30 may include one or more flanges 37, which extend into the cavity 35 at the upper end of the cavity. As shown in FIG. 15, these flanges engage or interfere with the ribs 26 of the stake end 22 to prevent over-rotation of the decoy, and to prevent it from spinning continuously in the wind. The interaction between the flanges 37 and the ribs 26 help to keep the decoy pointed in the same general direction it was initially placed in.

C. Stake End

As best shown in FIGS. 8-12, and also throughout the figures, the system also includes a stake 20 and stake end 22 which is designed for use with the motion cone 30. The stake end may be formed at an end of, and integral to, the stake 20, or it may be made separately and installed on a stake 20. The upper portion of the stake end 22 may have one or more ribs 26 that extend radially outward from the stake end. In the embodiment shown, there are three ribs 26, spaced 120° apart. As also shown, the ribs may have substantially flat bottoms and rounder upper surfaces, which allows for the decoy to rock or wobble in the wind, which motion would be somewhat limited if the ends of the ribs 26 were vertical. As mentioned above, the rounded shape also helps guide the decoy onto the stake end 22.

Figure 13A:
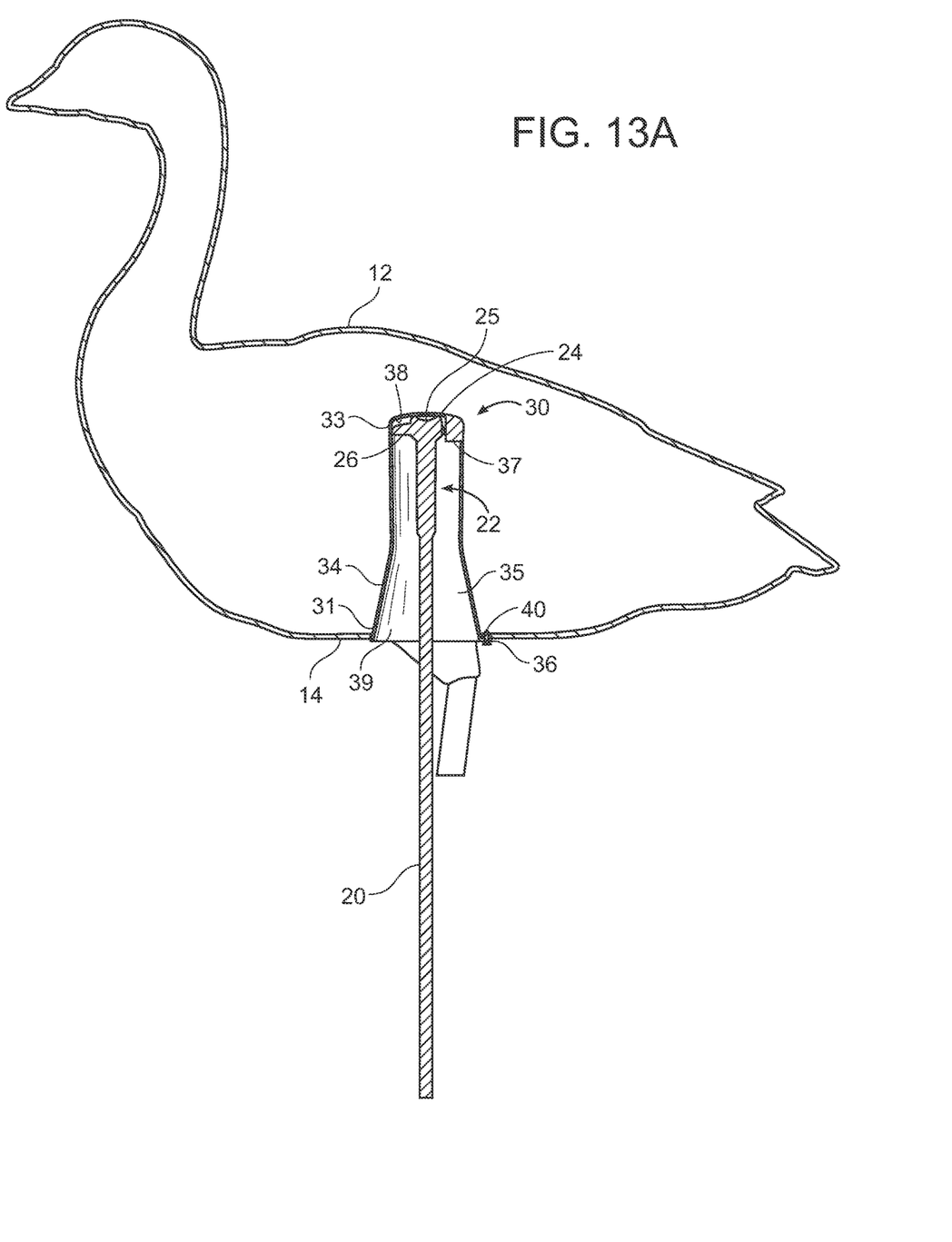
FIG. 13A is a sectional view of a supported decoy in accordance with an example embodiment.
Figure 13B:
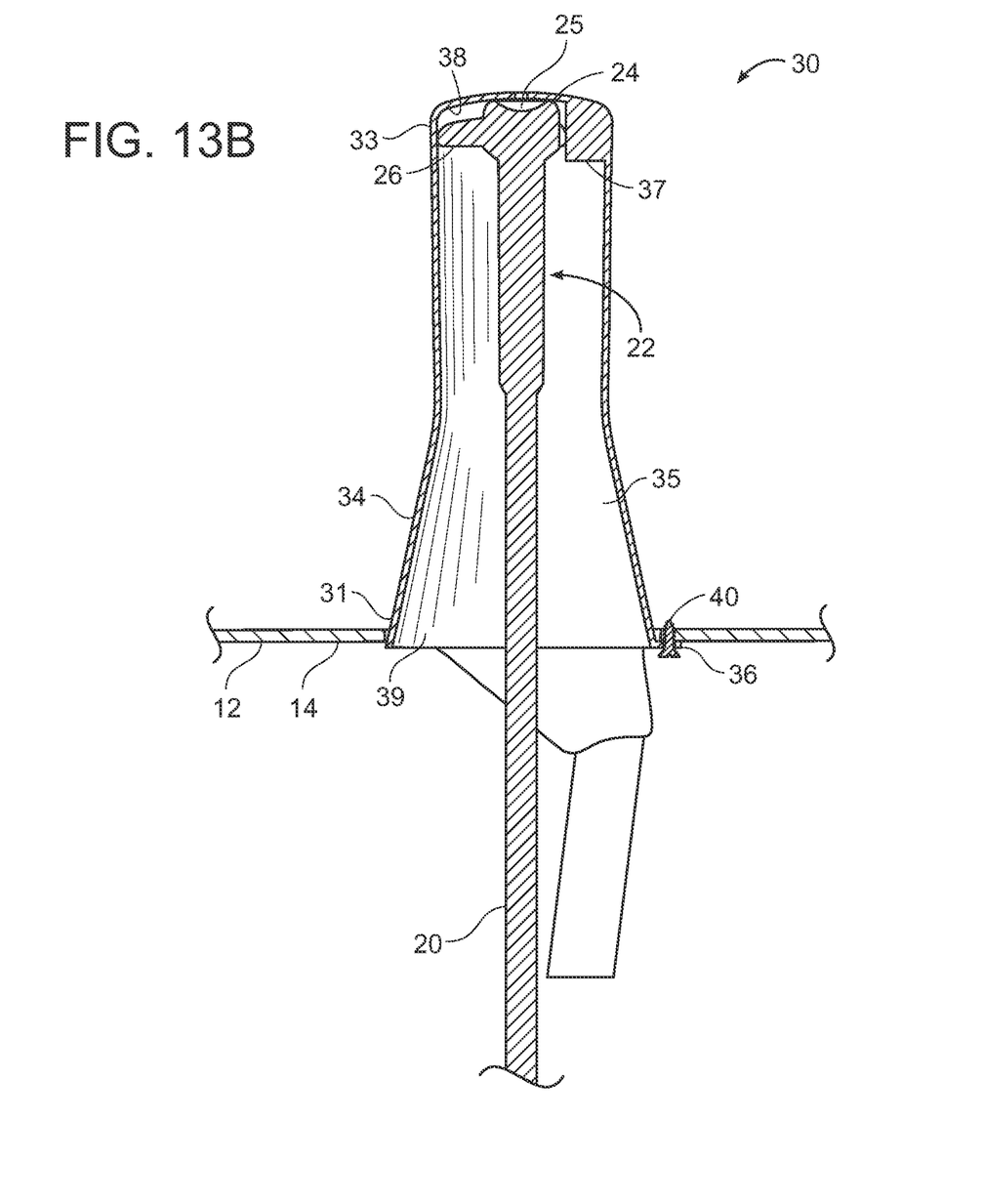
FIG. 13B is a sectional detail view of a supported decoy in accordance with an example embodiment.
Figure 14A:
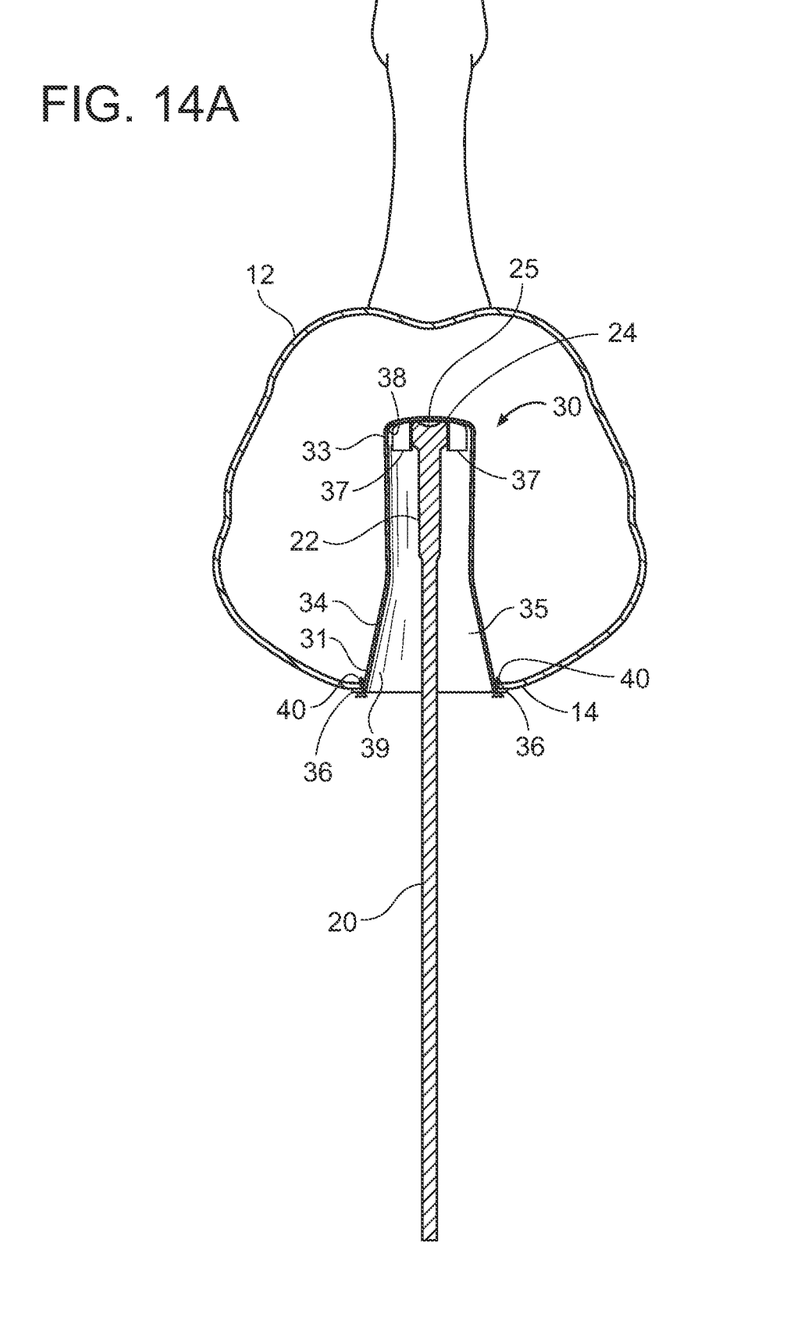
FIG. 14A is another sectional view of a supported decoy in accordance with an example embodiment.
Figure 14B:
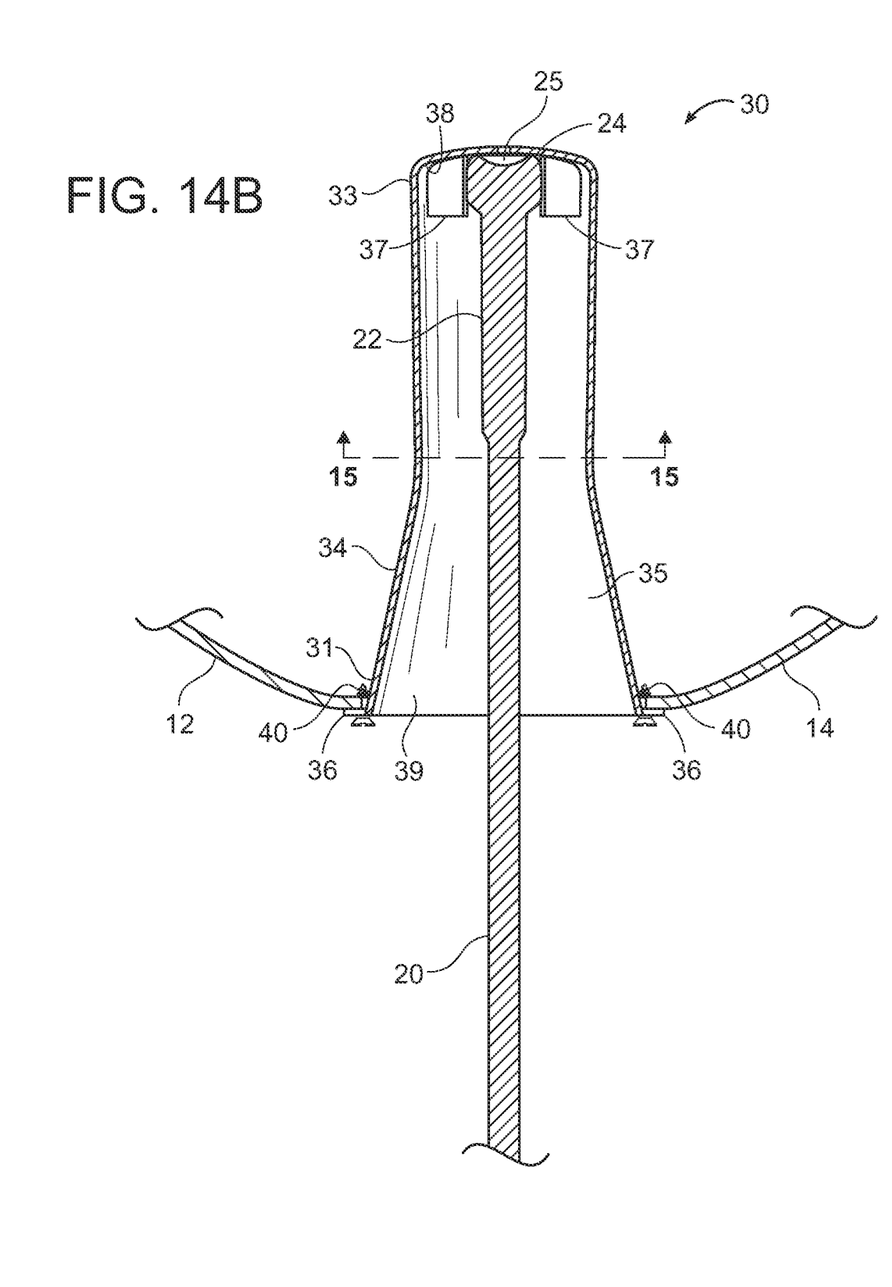
FIG. 14B is another sectional detail view of a supported decoy in accordance with an example embodiment.

As best shown in FIG. 13B, the upper end of the stake end 22 may have a concavity 25 or other void, which creates a ring-shaped upper surface 24 that is generally in contact with the concave upper, inner surface 38 of the motion cone 30, which thus supports the decoy 10 on stake 20. Due to the fairly close fit between the ribs 26 and the inner surface of the cone in the cylindrical portion 32, the cone, and accordingly the decoy, stays centered on the stake end 22 as intended, as best shown in FIG. 15, even in windy conditions.

D. Operation of Preferred Embodiment

Figure 1:
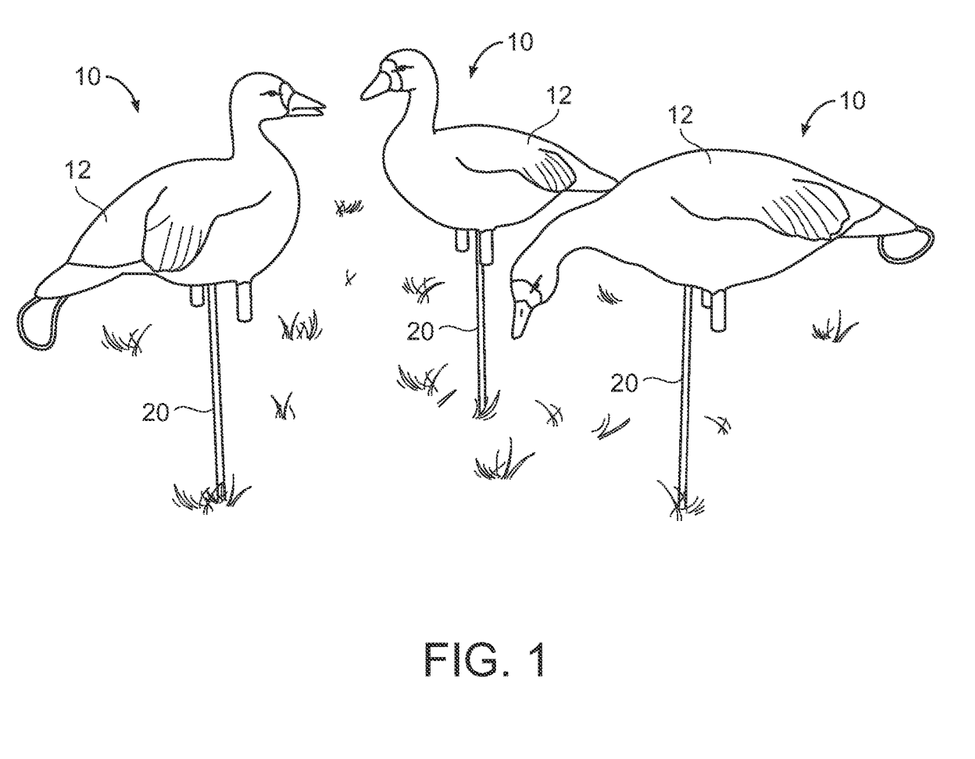
FIG. 1 is a perspective view of a number of decoys in accordance with an example embodiment deployed in an outdoor environment.
Figure 2:
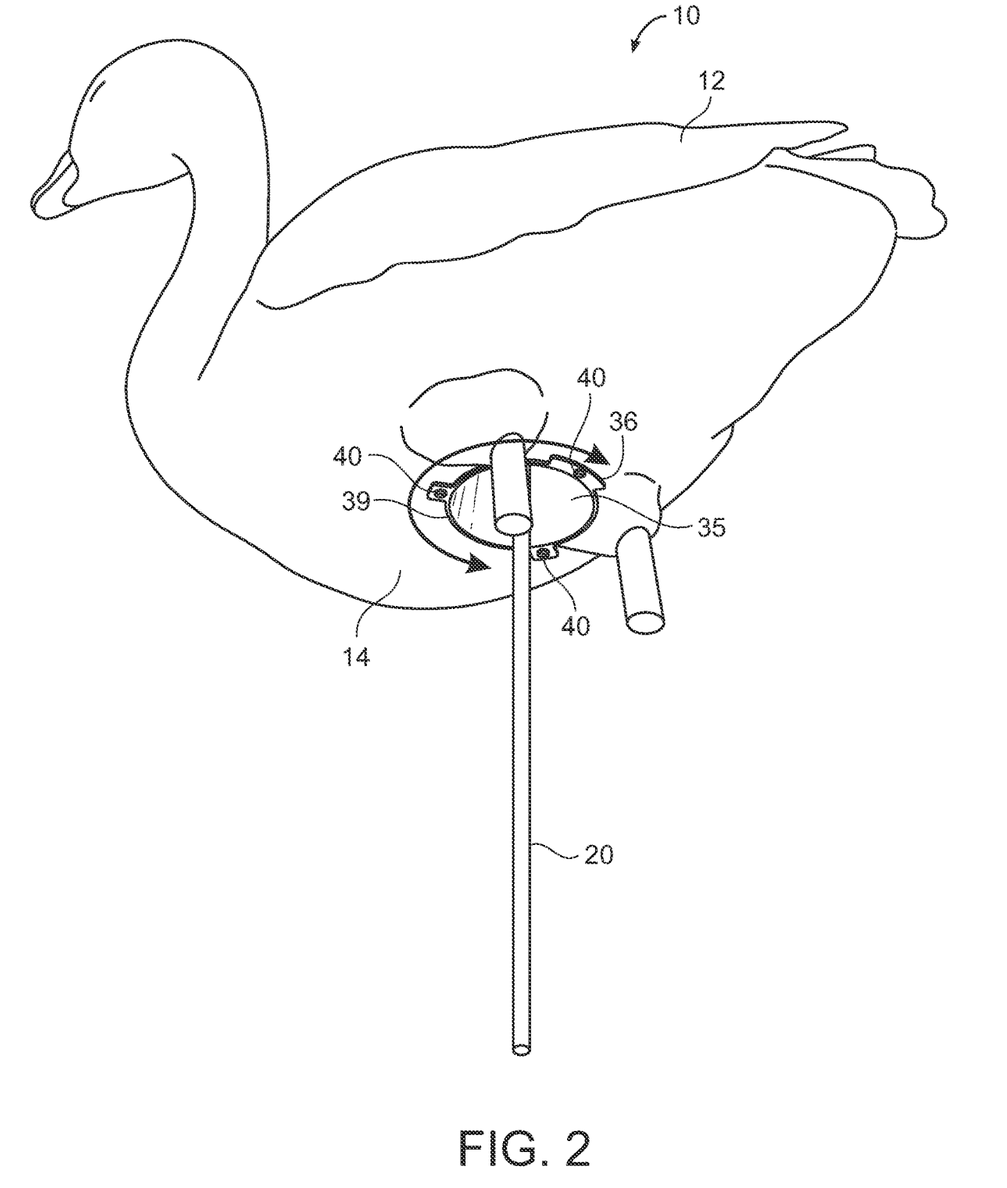
FIG. 2 is a lower perspective view showing a decoy on a stake in accordance with an example embodiment.
Figure 3:
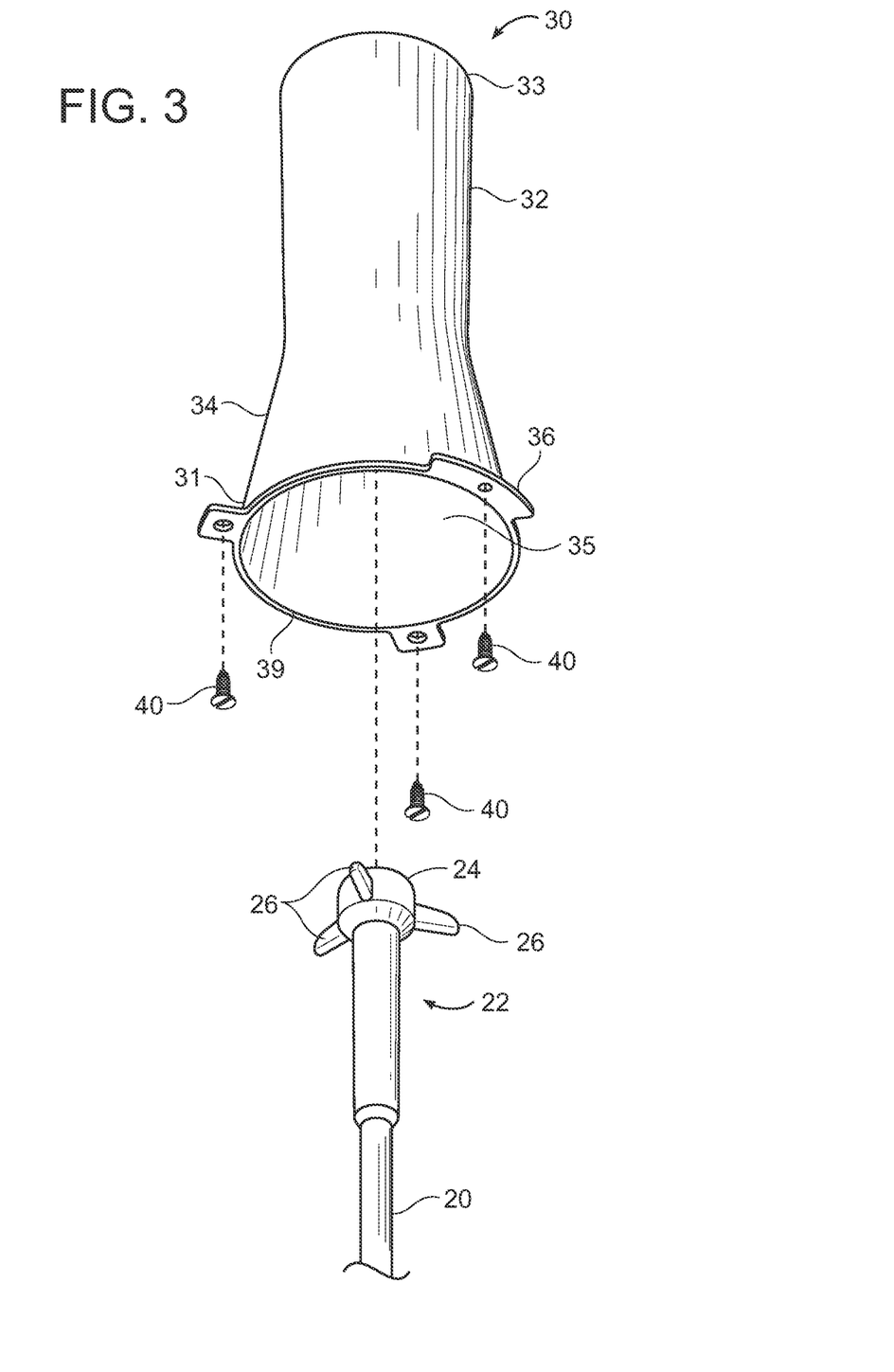
FIG. 3 is a lower perspective detail view showing of a decoy on a stake in accordance with an example embodiment.
Figure 4:
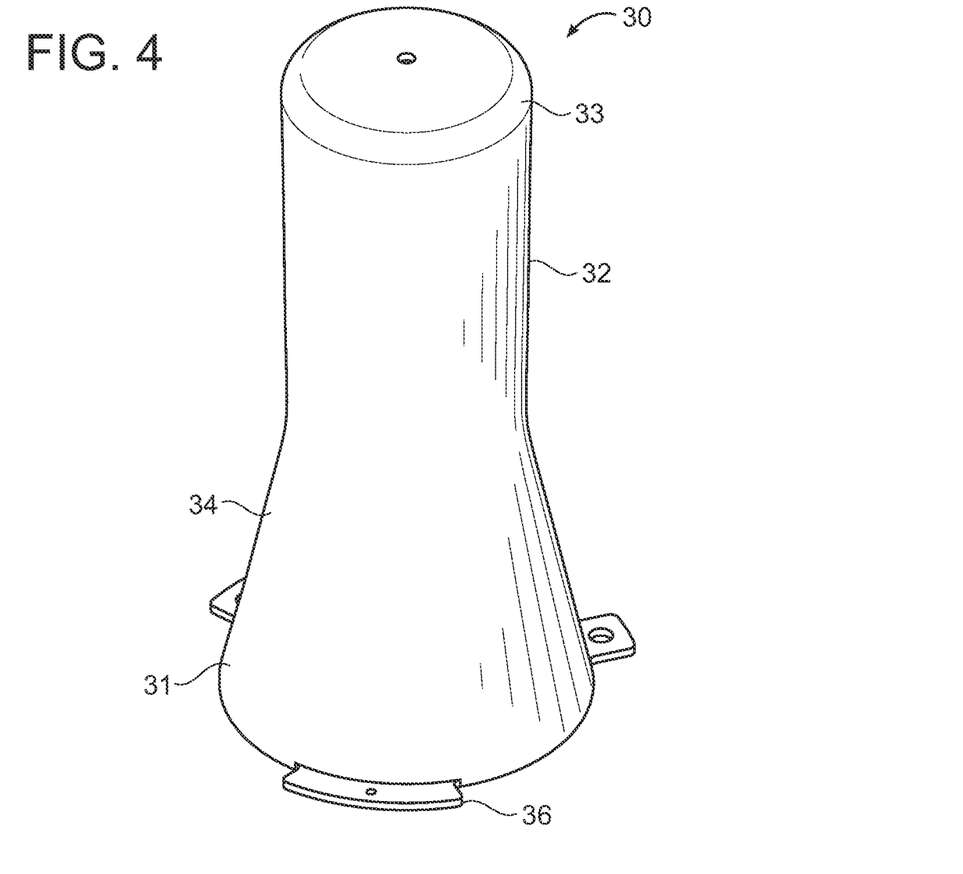
FIG. 4 is a perspective view of a motion cone usable in accordance with an example embodiment.

In use, a number of decoys 10 may be placed in a desirable hunting location in a decoy spread to simulate a natural gathering of waterfowl or other game birds, as shown in FIG. 1. In addition, it is often desirable for at least some of the decoys to exhibit natural motion, similar to actual birds, in order to attract game birds, which can be cautious, especially if decoys do not appear to be real birds to at least some extent, or to be simulating a behavior that gives the target fowl confidence in the area, or creates curiosity. As shown in FIG. 2, numerous decoys 10 supported by stakes 20 can rotate in the presence of wind, and can also rock or wobble, which can create the appearance of natural feeding motion of the decoys.

Typically, a hunter may set up a decoy spread by first placing multiple stakes 20 in the ground in a pattern, for placement of multiple decoys 10 in the area. Further, the stakes may be placed some time ahead of when the decoys will be used, or may be left in place for some time. Accordingly, a hunter may need to place decoys on stakes 20 at night, or in low-light conditions. As shown in FIGS. 3 and 13A-14B, the large opening 39 at the funnel-shaped end 31 of motion cone 30 may be used to allow easy installation of decoys 10 on stakes 20 positioned in a hunting area. The motion cone 30 has a first end 31, a second end 33, and a cavity 35 extending into the first end 31 toward the second end 33.

The opening of the motion cone 30 is considerably larger than the cylindrical interior portion 32 of the cone 30, which must be smaller in diameter to create a relatively close fit of the ribs 26 on stake end 22, which prevents the decoy from becoming incorrectly positioned on the stake 20. The funnel shape of the cone 30 at the first end 31 serves to guide the decoy onto the stake 20 as the decoy is dropped onto the stake 20, and the stake end 22 is guided onto the smaller diameter cylindrical portion 32 of the motion cone as it is lowered to its final position, due to the relatively smooth, continuous inner surface of the motion cone 30, which may be seen in FIGS. 13B and 14B, for example.

As discussed briefly above, the rounded tips of ribs 26 also facilitate easy placement of a decoy 10 on a stake 20, as does the fact that the motion cone 30 is mounted to be flush with the bottom 14 of the decoy 10. Due to this flush mount, there is no lip or edge of the motion cone 30 extending below the bottom 14 for the stake end 22 to catch on. The flush mount can be seen in FIGS. 2 and 13A-14B, for example.

As shown the figures, and especially FIG. 13B, the motion cone 30 may have a concave upper, inner surface 38, and further, the upper end of stake end 22 may have a central indentation, hole, or other void that creates a ring-shaped upper surface 24, upon which surface 38 rests. These shapes allow for reduced friction between the two parts, which in turn allows the decoy 10 to move easily in even a light breeze. As also shown in the figures, the shape of the interior of motion cone 30 and stake end 22, and ribs 26, allows the decoy 10 to rock freely on the stake 20, without interference between the parts of the stake end 22 and the motion cone 30.

The flanges 37 on the interior of the motion cone 30, in cooperation with the ribs 26 on stake end 22, limit the amount of rotation of decoy 10 when the wind blows. This is desirable because a hunter may wish to orient the decoys in a certain direction, within limits, while still allowing for some rotation and motion. For example, a hunter may wish to place decoys so that some or most of them are facing in the general direction of the wind, or at least place them in a desired orientation according to wind or other conditions.

As best shown in FIG. 15, the ribs 26 will encounter flanges 37 whenever a decoy 10 rotates more than a certain amount about stake 20. Although different arrangements are possible, the configuration of three equally-spaced ribs and flanges, at 120°, allows for the decoy to rotate ⅓ of a full rotation before a rib hits a flange, which will generally result in a reversal of direction, and may also tend to create a rocking motion of the decoy. This arrangement allows a hunter to place a decoy 10 in a given directional orientation, which the decoy will remain in, within ⅓ of a rotation.

Unless otherwise defined, all technical and scientific terms used herein have the same meaning as commonly understood by one of ordinary skill in the art to which this invention belongs. Although methods and materials similar to or equivalent to those described herein can be used in the practice or testing of the moving decoy support system, suitable methods and materials are described above. All publications, patent applications, patents, and other references mentioned herein are incorporated by reference in their entirety to the extent allowed by applicable law and regulations. The moving decoy support system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A decoy, comprising:
a stake having an upper portion and a first rib that extends outwardly from the upper portion;
a decoy body having a bottom;
an opening extending into the bottom of the decoy body;
a cavity extending from the opening upwardly into the decoy body, wherein the cavity is defined by an inner surface, wherein the cavity includes a top portion enclosing the cavity, wherein the top portion includes an upper surface that is shaped to movably support the decoy on the upper portion of the stake, and wherein the decoy is rotatable relative to the upper portion of the stake; and
a plurality of motion-limiting flanges that extend vertically from the upper surface of the top portion into the cavity to directly interface with the first rib.

2. The decoy of claim 1, wherein the plurality of motion-limiting flanges extend inwardly from an interior side surface of the cavity.

3. The decoy of claim 1, wherein the inner surface of the cavity is substantially smooth and continuous from the opening to the upper surface of the top portion.

4. The decoy of claim 1, wherein the upper surface of the top portion is above a center of gravity for the decoy body.

5. The decoy of claim 1, wherein the top portion of the cavity is cylindrical.

6. The decoy of claim 1, wherein the upper surface comprises a concave portion.

7. The decoy of claim 1, further comprising a second rib extending outwardly from the upper portion of the stake.

8. The decoy of claim 7, further comprising a third rib extending outwardly from the upper portion of the stake.

9. The decoy of claim 8, wherein the first rib, the second rib and the third rib are each 120 degrees apart from one another.

10. The decoy of claim 8, wherein the plurality of motion-limiting flanges comprise three motion-limiting flanges that are equidistantly spaced about the cavity.

11. The decoy of claim 1, wherein the first rib has an upper rounded surface.

12. The decoy of claim 11, wherein the upper surface comprises a concave portion.

13. The decoy of claim 1, wherein an outermost point of the first rib is close to an inner surface of the top portion.

14. The decoy of claim 1, wherein the upper portion of the stake includes a ring-shaped upper surface that contacts the upper surface of the top portion.

15. The decoy of claim 1, wherein a cross sectional area of the cavity decreases in relation to a distance from the opening toward the top portion.

16. The decoy of claim 1, wherein the cavity is funnel shaped.

17. A decoy, comprising:
a stake having an upper portion and a plurality of ribs that extend outwardly from the upper portion;
a decoy body having a bottom;
an opening extending into the bottom of the decoy body;
a cavity extending from the opening upwardly into the decoy body, wherein the cavity is defined by an inner surface, wherein the cavity includes a top portion enclosing the cavity, wherein the top portion includes an upper surface that is shaped to movably support the decoy on the upper portion of the stake, and wherein the decoy is rotatable relative to the upper portion of the stake; and
at least one motion-limiting flange extending vertically from the upper surface of the top portion into the cavity to directly interface with one of the plurality of ribs.

18. The decoy of claim 17, wherein the at least one motion-limiting flange extends inwardly from an interior side surface of the cavity.

19. The decoy of claim 17, wherein the inner surface of the cavity is substantially smooth and continuous from the opening to the upper surface of the top portion.

20. The decoy of claim 17, wherein the upper surface of the top portion is above a center of gravity for the decoy body.

21. The decoy of claim 17, wherein the top portion of the cavity is cylindrical.

22. The decoy of claim 17, wherein the upper surface comprises a concave portion.

23. The decoy of claim 17, wherein the plurality of ribs are each 120 degrees apart from one another.

24. The decoy of claim 17, wherein the plurality of ribs each have an upper rounded surface.

25. The decoy of claim 24, wherein the upper surface comprises a concave portion.

26. The decoy of claim 25, wherein an outermost point of each of the plurality of ribs is close to an inner surface of the top portion.

27. The decoy of claim 17, wherein the upper portion of the stake includes a ring-shaped upper surface that contacts the upper surface of the top portion.

28. The decoy of claim 17, wherein a cross sectional area of the cavity decreases in relation to a distance from the opening toward the top portion.

29. The decoy of claim 17, wherein the cavity is funnel shaped.

30. A decoy, comprising:
a stake having an upper portion and a rib that extends outwardly from the upper portion, wherein the rib has an upper rounded surface;
a decoy body having a bottom;
an opening extending into the bottom of the decoy body;
a cavity extending from the opening upwardly into the decoy body, wherein the cavity is defined by an inner surface, wherein the cavity includes a top portion enclosing the cavity, wherein the top portion includes an upper surface that is shaped to movably support the decoy on the upper portion of the stake, wherein the upper surface of the top portion is above a center of gravity for the decoy body, and wherein the decoy is rotatable relative to the upper portion of the stake; and
a plurality of motion-limiting flanges that extend vertically from the upper surface of the top portion into the cavity to directly interface with the rib, and wherein the plurality of motion-limiting flanges extend inwardly from an interior side surface of the cavity.

31. The decoy of claim 30, wherein the inner surface of the cavity is substantially smooth and continuous from the opening to the upper surface of the top portion.

32. The decoy of claim 30, wherein the top portion of the cavity is cylindrical.

33. The decoy of claim 30, wherein the upper surface comprises a concave portion.

34. The decoy of claim 30, wherein the upper surface comprises a concave portion.

35. The decoy of claim 30, wherein an outermost point of the rib is close to an inner surface of the top portion.

36. The decoy of claim 30, wherein the upper portion of the stake includes a ring-shaped upper surface that contacts the upper surface of the top portion.

37. The decoy of claim 30, wherein a cross sectional area of the cavity decreases in relation to a distance from the opening toward the top portion.

38. The decoy of claim 30, wherein the cavity is funnel shaped.

* * * * *